July 18, 1944.  E. J. RUEB ET AL  2,354,065
BATTERY CHARGER
Filed April 15, 1943  2 Sheets-Sheet 1

INVENTORS,
Earl J. Rueb,
BY John E. Trulson.
Roy E. Hamilton Attorney.

July 18, 1944.  E. J. RUEB ET AL  2,354,065
BATTERY CHARGER
Filed April 15, 1943  2 Sheets-Sheet 2
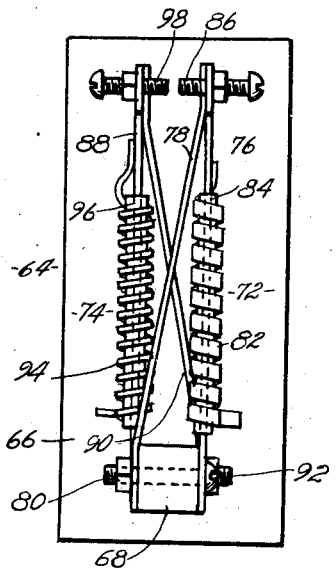
Fig. 4
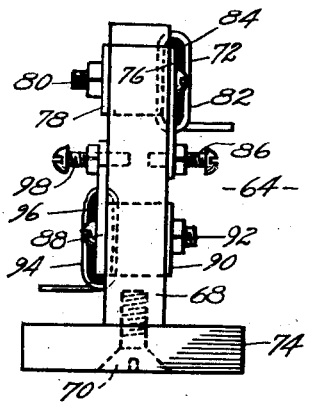
Fig. 5
Fig. 6
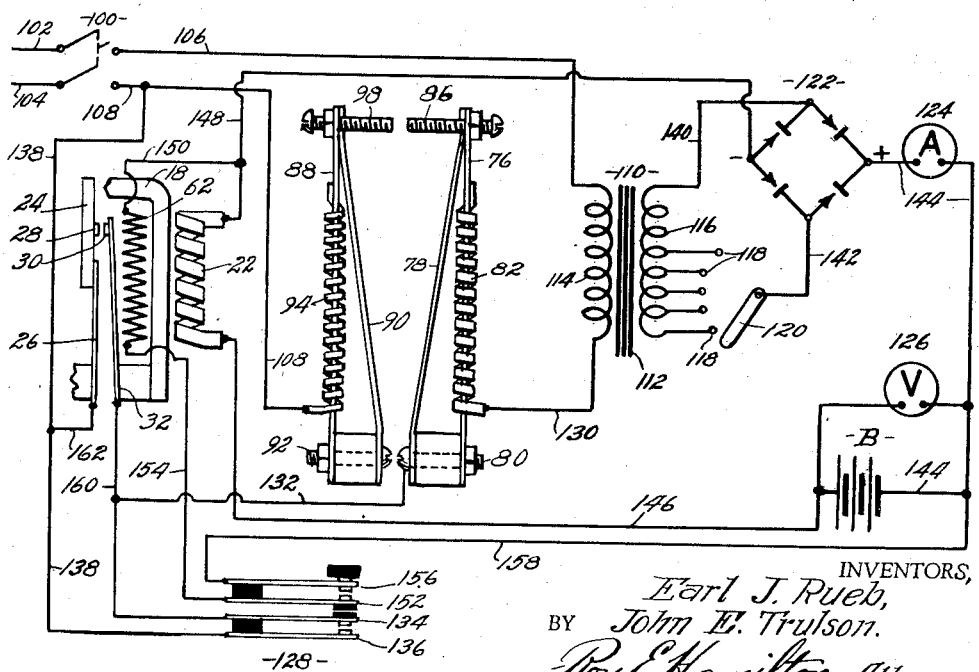
INVENTORS,
Earl J. Rueb,
BY John E. Trulson.
Roy E. Hamilton, Attorney.

Patented July 18, 1944

2,354,065

UNITED STATES PATENT OFFICE 2,354,065

BATTERY CHARGER

Earl J. Rueb and John E. Trulson,
Kansas City, Mo.

Application April 15, 1943, Serial No. 483,215

7 Claims. (Cl. 320—39)

This invention relates to improvements in storage battery charger system, and has particular reference to an improved battery charger suitable for rapid and safe charging.

The principal object of the present invention is the provision of a storage battery charger having automatic control means within the primary circuit to vary the charging current.

Another object of the invention is the provision of a battery charger system which when started will automatically vary the charging rate and cut off when the battery is properly charged without the use of any mechanical timing means.

A further object of the invention is the provision of a storage battery charging system having an adjustable relay whereby the change of battery charging current may be varied to any degree or stage of the battery charge.

Other objects are simplicity and economy of construction, ease and safety of operation, and adaptability for use in charging storage batteries while positioned in the automobile.

Reference will now be had to the drawings wherein:

Fig. 4 is a plan view of a variable resistance used in this system.

Fig. 5 is an end elevational view of the variable resistance shown in Fig. 4.

Fig. 6 is a diagrammatic view showing the complete battery charging system.

Figure 1:
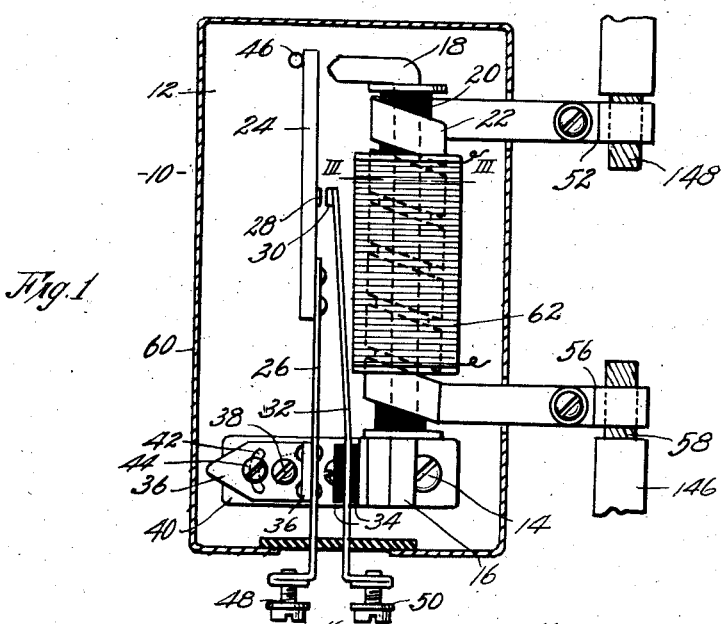
Fig. 1 is a plan view of a relay partly broken away and used in the system.
Figure 2:
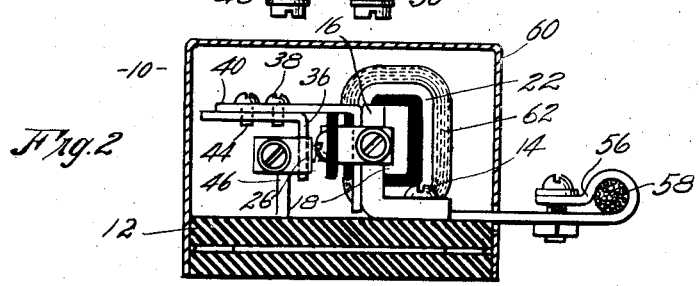
Fig. 2 is an end view partly in section of the relay shown in Fig. 1.
Figure 3:
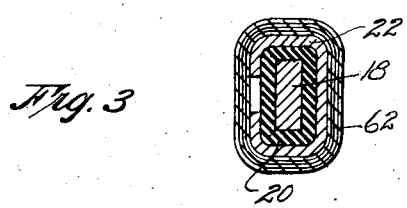
Fig. 3 is a sectional view taken on line III—III of Fig. 1.

Throughout the several views like reference characters refer to similar parts and the numeral 10 designates a relay shown in detail in Figs. 1, 2, and 3 and comprising a base 12 of insulating material to which is attached by screw 14 a standard 16 which in turn carries an iron core or magnetic pole piece 18 in parallel relation with, but spaced apart from the base 12. An insulating member 20 is positioned on core 18 to receive a heavy copper coil 22. About six coils of heavy wire has been found very satisfactory for coil 22. An armature 24 having a heavy supporting spring member 26 has a contact point 28 which is adapted to contact point 30 carried by resilient bar 32 carried by but insulated from standard 16 by insulators 34. The spring member 26 is secured to a bracket 36 pivotally mounted for adjustment by pin 38 on an L-shaped bracket 40 secured to standard 16. Bracket 36 is provided with an arcuate slot 42 through which the body of lock screw 44 extends to engage bracket 40 whereby the armature is adjusted relative to the pole piece 18. This adjustment makes it possible to vary the resistance of the armature to the pull of the electromagnet. A stop 46 mounted in base member 12 serves to limit the outward movement of the armature. The armature is provided with a binding post 48 and the bar 32 has a binding post 50. It will be noted that the coil 22 terminates at its one end in a clamp 52 to receive the battery terminal 148 and at its other end in a clamp 56 to receive battery atrminal 146. A housing 60 mounted on base 12 serves to cover the working parts of the relay, and is so constructed so as to prevent short circuiting of the electrical connectors. A starting coil 62 of relatively fine insulated wire is wound about coil 22. This starting coil is made of about two hundred turns relatively fine wire which are disposed about core 18 so as to coact with coil 22 during the starting period.

Reference will now be had to the variable resistance thermostatic switch 64 comprising a base 66 to which is securely attached a vertical standard 68 by means of screw 70. Standard 68 is made of an electrical insulating material and carries two thermostatically operated switch members 72 and 74 in vertically spaced apart relation.

Switch member 72 comprises a bar 76 secured at its outer end to a bar 78 which is disposed at an acute angle thereto so that the bars 76 and 78 engage opposite sides of standard 68 and are securely attached thereto by means of bolt 80. These bars are adapted to carry an electric current and to expand and contract upon change of temperature. A relatively heavy coil 82 is wound about an insulating shield 84 encasing a portion of bar 76 and has one of its ends in contact with said bar and its other end connected in series in the primary circuit as hereinafter described. The extremity of bar 76 carries an adjustable switch point 86.

Switch member 74 is made in like manner to member 72 having two diverging bars 88 and 90 contacting at their free ends and secured at their open ends on opposite sides of standard 68 by means of bolt 92. A resistance coil 94 of relatively higher resistance than coil 82 is wound about bar 88 and insulated therefrom by an insulating boot 96, one end of this coil is fixed in contact with bar 88 while its other end is connected in the primary circuit. This switch member 74 also carries an adjustable switch contact point 98 which is disposed in substantially axial alignment with switch point 86. When current is passed through coil 82, a bar 76 will be heated sufficiently to cause it to expand and move the switch point 86 so that it will contact the point 98 and close the switch whereby coils 82 and 94 will be connected in series as hereinafter described.

Reference will now be had to the battery charging system shown diagrammatically in Fig. 6. B designates the battery to be charged. The double pole switch 100 is adapted to connect the A. C. current line wires 102 and 104 with the primary line wires 106 and 108 of the primary circuit of the system. A transformer 110 having iron core 112, primary coil 114, and secondary coil 116 having a plurality of taps 118 adapted to be selectively connected in the secondary circuit by switch arm 120, is of the standard type. The rectifier 122 is shown as the bridge type but any other suitable type might be used.

Ammeter 124 and voltmeter 126 are also included in the battery charging circuit. A manually operable remote control double switch 128 is also included in the circuits. When the double pole switch 100 is closed and the hand operated double switch is closed, the current passes through live wire 106 to one side of the primary coil 114 to wire 130 and to resistance coil 82. The current then passes to bar 76, bar 78 through wire 132 to switch member 134, to switch member 136 thence by wire 138 to the other live wire 108.

The secondary or battery charging circuit receives an induced current in coil 116 when the switch arm is positioned on one of the taps 118 and this current is conducted through wire 140 to the bridge rectifier 122. The other end of coil 116 is connected through switch arm 120 and wire 142 to the other side of the rectifier. The direct current from the rectifier is conducted by wire 144 to charge battery B. The other side of the battery is connected by wire 146 to one end of resistance coil 22 of the relay. The other end of coil 22 is connected by wire 148 to the negative side of the rectifier. Starting coil 62 is joined to wire 148 by wire 150 and to switch member 152 by wire 154. The other switch member 156 is joined to wire 144 by conductor 158. The resilient bar 32 is connected by wire 160 to wire 132 and the armature is joined to wire 138 by means of wire 162. It will be noted that the ammeter 124 is in live wire 144 and that the voltmeter 126 is positioned across the battery charging lines.

The operation of the charger is as follows: The battery B is connected in the system, switch 100 is closed, then the operator presses the double switch 128 to the closed position, thus closing the primary circuit so that the alternating current from line 102 passes through wire 106, primary coil 114, wire 130, resistance coil 82, bar 76, bar 78, wire 132, switch members 134 and 136, wire 138 to wire 108, switch 100 to live wire 104.

The induced current set up in the secondary coil 116 is connected by wire 140 to one side of the bridge rectifier and by wire 142 through closed switch arm 120 to the other side of coil 116. To vary the current in the charging circuit the switch arm may be set on any one of the taps 118, thus lengthening or shortening the effective length of the coil. The direct current from the positive side of the rectifier passes through wire 144 to the battery B for charging and the other battery terminal is connected through wire 146, coil 22, and wire 148 to the negative side of the rectifier.

Current is also supplied to starting coil 62 when switch members 156 and 152 are closed through wire 154, coil 62, wire 150, wire 148, rectifier 122, wire 144 and wire 158. The current in coil 62 and coil 22 is passing about core 18 in the same direction thus combining to increase the magnetic field in the core to operate the armature 24 to close switch contacts 28 and 30. When this relay switch is closed the operator may release switches 128 so that the current flow will be as follows: The current from live wire 102 will pass through wire 106, primary coil 114, wire 130, resistance coil 82, bar 76, bar 78, wire 132, wire 160, arm 32, point 30, wire 108 to the other live wire 104.

The battery charging circuit will be as follows: The direct current from the rectifier will pass by wire 144 to the battery, then by wire 146 to coil 22, thence to the rectifier by wire 148. The starting coil will now be cut out and if the resistance of the battery is not too high there will be sufficient current flow through coil 22 to maintain the switch points 28 and 30 closed. If the battery resistance is too high then it may be necessary for the operator to again close the double switch 128 until such time that there will be sufficient magnetic force to hold the armature 24 in contact with pole piece 18. It is to be remembered that the resistance of the armature to the magnetic pull may be varied to suit the currents and coil windings.

The current through coil 22 will be sufficient to maintain armature 24 closed until the battery has reached a predetermined degree of charge. During this first charging stage of the battery the contact points 86 and 98 will be closed due to the heating of the bar 76 by the current passing through coil 82, however due to the resistance of coil 94 no current will pass by wire 108 to the live wire 104.

As the battery reaches the preliminary charging stage, which should be below the violent gassing point or the dangerous stage, then the armature 24 will be released and the switch points 28 and 30 will be opened. The low battery charging current will now be on since the current from the primary coil will need to pass by wire 130 to coil 82, to bar 76, point 86, point 98, bar 88, coil 94, wire 108 to the live wire 104.

The higher resistance coil 94 is now in series with coil 82 so that the points 86 and 98 will remain in contact with the battery until the same becomes properly charged regardless of the time required. When the battery is fully charged the current flow to the resistance coil 94 drops thus permitting bar 88 to cool sufficiently to open points 86 and 98 thus cutting off the current to the system.

It is quite apparent that the battery charging rate might be varied so as to have more than two stages by simply duplicating the relay and resistance coils just described, however the disclosure of the drawings and specification are sufficient to make clear the possibility of making as many stages as might be desired.

Many changes might be made in the construction of various elements of this system, furthermore, many modifications in the general arrangements of the parts might be made without departing from the spirit of the invention and the scope of the appended claims.

What we claim as new and desire to cover by Letters Patent is:

1. A battery charger comprising a primary circuit, a secondary circuit adapted for connection with the terminals of the battery to be charged, means to vary the primary circuit whereby the battery charging rate is varied, said means including a thermostatic switch controlled by the secondary circuit as the battery is charged to a partial predetermined degree.

2. A battery charging system comprising a primary alternating circuit, a secondary circuit including a rectifier adapted to be connected with the terminals of the battery to be charged, means to vary the flow of current in said primary circuit whereby the battery charging rate is varied, said means including a thermostatic switch controlled by the secondary circuit as the battery is charged to a predetermined degree.

3. A battery charging system comprising a primary alternating circuit, a secondary circuit including a rectifier adapted to be connected with the terminals of the battery to be charged, means to vary the flow of current in said primary circuit whereby the battery charging rate is varied, said means including a resistance operated by a thermostatic switch controlled by the secondary circuit as the battery is charged to a predetermined degree.

4. A battery charging system comprising a transformer having a plurality of taps, a rectifier, a relay, a charging circuit, adapted to be connected with the terminals of a battery to be charged and including said rectifier, relay, and a switch member cooperating with said taps, and a primary circuit including a thermostatic switch controlled by said relay in said charging circuit whereby the charging current to said battery is varied.

5. A battery charging system comprising a transformer, a rectifier, a relay, a charging circuit adapted to be connected with the terminals of the battery to be charged and including said rectifier, relay and the secondary coil of said transformer, a primary circuit including a source of alternating current, the primary coil of said transformer and a variable resistance thermostatic switch controlled by said relay until the battery has been charged to a predetermined degree and adapted to be automatically opened when the battery is fully charged.

6. A battery charging system comprising a transformer, a rectifier, a relay, a charging circuit adapted to be connected with the terminals of the battery to be charged and including said rectifier, relay and the secondary coil of said transformer, a primary circuit including a source of alternating current, the primary coil of said transformer and a variable resistance thermostatic switch connected through said relay until the battery has been charged to a predetermined partial degree and then connected through all the resistance of said variable resistance directly to the current supply line whereby when the battery is fully charged said switch will open to cut off the current supply to the primary coil.

7. A battery charging system comprising a primary circuit, a charging circuit adapted for connection with the terminal of a battery to be charged and having means to vary the charging rate, said means including a pair of thermostatic switch members, and a relay having contact points adapted to short-circuit one of said switch members from the primary circuit until said battery has been partially charged and then to separate to permit the flow of current through both of said thermostatic switch members whereby the battery charging current in the secondary circuit will be reduced until the battery is completely charged and will then be automatically cut off.

EARL J. RUEB.
JOHN E. TRULSON.